United States Patent [19]

Weidner

[11] 3,725,322

[45] Apr. 3, 1973

[54] HEAT CURABLE ELASTOMERIC COMPOSITION AND PRODUCTS

[75] Inventor: Charles Leslie Weidner, Cranbury, N.J.

[73] Assignee: Johnson & Johnson, New Brunswick, N.J.

[22] Filed: Apr. 23, 1971

[21] Appl. No.: 136,994

Related U.S. Application Data

[60] Division of Ser. No. 87,336, Nov. 5, 1970, , which is a continuation-in-part of Ser. No. 672,464, Oct. 3, 1967, abandoned.

[52] U.S. Cl. ....................260/3, 117/122 PA, 260/5, 260/25, 260/27 BB, 260/831, 260/844, 260/845, 260/846
[51] Int. Cl. ...........................C08g 37/16, C08d 9/10
[58] Field of Search..............260/3, 5, 844, 845, 846; 117/122 PA

[56] References Cited

UNITED STATES PATENTS

| | | | |
|---|---|---|---|
| 1,273,967 | 7/1918 | Wennagel | 260/57 |
| 2,144,101 | 1/1939 | Butler | 260/53 |
| 2,272,155 | 2/1942 | Muller | 260/57 |
| 2,736,718 | 2/1956 | Webber | 260/29.3 |
| 2,988,536 | 6/1961 | Hine et al. | 260/57 |
| 3,020,254 | 2/1962 | Less et al. | 260/57 |
| 3,052,515 | 9/1962 | Donaruma | 23/14.5 |
| 3,231,419 | 1/1966 | Korpman | 117/122 |

FOREIGN PATENTS OR APPLICATIONS 1,800,481  4/1969  Germany

Primary Examiner—John C. Bleutge
Attorney—Charles A. Harris

[57] ABSTRACT

This specification discloses a new oil soluble phenol formaldehyde resin which comprises a reacted condensation catalyst consisting essentially of an alkaline earth metal salt of a hydroxy ring substituted monobasic aromatic or phenyl terminated aliphatic acid. The catalyst first acts to catalyze the condensation process and then is available to act as an accelerator in the event the resulting resin is to be used for curing compositions such as pressure-sensitive adhesives. Reactive and non-reactive resins of this invention, corresponding adhesives, and various catalysts such as zinc salicylate and others, are disclosed.

14 Claims, No Drawings

HEAT CURABLE ELASTOMERIC COMPOSITION AND PRODUCTS

This application is a division of Applicant's co-pending application Ser. No. 87,336, filed Nov. 5, 1970 now U.S. Pat. No. 3,624,038, which, in turn, is a continuation-in-part of Applicant's application Ser. No. 672,464, filed Oct. 3, 1967, now abandoned. This application is directed to species which were non-elected in said co-pending application.

The present invention relates to phenol-formaldehyde resins and the preparation thereof and to adhesives wherein such resins are used to cure the adhesive composition and reduce its thermoplasticity; more particularly, to such adhesives wherein the resin is reactive and oil soluble and the adhesive remains normally tacky and pressure-sensitive after curing and is adapted to be cured in situ after being coated on a backing to form a pressure-sensitive adhesive sheet or tape, and to the resulting sheets and tapes.

Heretofore, it has been common in the preparation of reactive oil-soluble resins to perform the initial resin reaction in an aqueous system, i.e., to treat a phenol with an alkali or alkaline earth metal hydroxide to form a salt such as sodium phenolate which disperses in water and then to add the formaldehyde, which also is soluble in water. When the mixture is reacted to the point where the formaldehyde is essentially depleted, it is treated with an acid which neutralizes the alkali and facilitates separation of the resin. It then is necessary to remove the water introduced into the reaction with the formalin and base and to wash the resinous mixture to remove salts formed during the neutralization along with other impurities. Obviously, the water used for washing purposes also must be removed from the resin. This is a time consuming and expensive process. A further dehydration step to remove occluded water and the water evolved during dehydration adds to the time and expense of the reaction.

When resins formed in this manner contain a mole ratio of formaldehyde to phenol greater than one, they normally are called resoles and remain heat reactive. When such resins are used to cure rubbers or when used as curing resins for forming heat-cured pressure-sensitive adhesives, it is customary to add an accelerator to assure that the cure occurs quickly and with the desired effectiveness. Zinc resinate is an example of a material which has been found to be particularly suitable for this purpose.

I have invented a new phenol-formaldehyde resin wherein the condensation catalyst is a reacted component of the resulting resin; and which, when produced in the form of a reactive resin with an excess of formaldehyde to phenol, does not require the addition of an accelerator for use as a curing resin in pressure-sensitive adhesive compositions. In other words, the reacted catalyst also acts as a "built in" accelerator in the curing of the adhesive. The resin of my invention may be produced quickly in one step in a substantially anhydrous process which does not require neutralization and/or washing steps. The water of condensation normally is removed by evaporation as the phenol and formaldehyde are heated together during the condensation process. According to my invention, the various components of the resin may be mixed directly with one another and subjected to heat until the desired level of condensation is reached.

The novel condensation catalyst of my invention is based upon an alkaline earth metal salt of a formaldehyde reactive phenol-type acid wherein the hydroxyl groups preferably are in the ortho or meta position with respect to the acid radical or chain.

The alkaline earth, divalent electropositive metal salt of this catalyst preferably is selected from the group consisting of zinc, cadmium, calcium, and magnesium. The zinc and cadmium salts have been found to be particularly effective for this purpose. The dibasic catalyst salt may be formed by reacting a base such as a metal oxide or a base donor such as an acetate salt with the appropriate acid prior to the beginning of the condensation process, or the base and the acid may be mixed directly into the phenol component prior to or simultaneously with the addition of formaldehyde.

The phenol-type acid may be a straight phenol acid wherein both the hydroxyl and carboxyl groups are ring substituents, or it may be in the form of a hydroxy ring substituted phenyl-terminated aliphatic acid. In other words, preferably the catalyst is in the form of an alkaline earth metal salt of an ortho, meta or ortho-meta hydroxy ring substituted monobasic aromatic or phenyl terminated aliphatic acid. Hydroxy ring substituted benzoic or napthoic acids such as salicylic acid, meta-hydroxy benzoic acid, gamma resorcylic, 2-hydroxy 3-napthoic acid, and the like are preferred in the first category; whereas unsaturated aliphatic acids having less than four carbon atoms in the aliphatic chain, such as ortho-hydroxy cinnamic acid, are preferred in the second category.

One of the advantages of this invention is that the catalyst which, in reactive resins eventually becomes the "built in" accelerator, is in the form of a phenol carboxylic acid salt. Thus, it condenses with the other phenolic constituents and the formaldehyde during the formation of resin. As a result, the basic metal catalyst is completely compatible and, if added in the proper proportions, will remain in a compatible relationship with the other components of the resin and will not precipitate or settle out. My invention, therefore, is particularly suitable for the co-condensing of different types of phenols including the reacted catalyst-accelerator, itself. In condensing aqueous phenol-formaldehyde resin with metal salts forming the catalyst by combining as a phenate salt, the acidity of the phenol determines the extent of metal salt formation, and hence controls the water solubility or dispersibility of the system. A highly acidic phenol such as phenol, itself, will deplete the base used as a catalyst before any of the less acidic phenols, such as nonyl phenol, can absorb the base, and a non-homogeneous resin will result. Selective solubility and reactivity are controlled by the acidity of the phenol and its compatibility with aqueous formaldehyde. In my system, which is essentially anhydrous, mutual phenol solubility and relative reactivities are the controlling factors in forming homogeneous resins. Mutual solubility in the anhydrous state is found among a broad spectrum of phenols. Thus, I may select from any number of phenolic constituents and mixtures thereof to form the resin of this invention.

The oil soluble phenol formaldehyde resin of this invention consists essentially of the product of the substantially anhydrous heat condensation of formaldehyde together with a major proportion by weight of a bifunctional first phenol, i.e., an ortho or para alkyl or aryl substituted phenol, and a minor proportion, preferably about 2–25 percent by weight of the resin, of the above-described phenolic condensation catalyst. This first phenol forms an oil soluble resin when condensed with formaldehyde. I prefer that a para octyl or para nonyl phenol be the main phenolic constituent of the first phenol. However, very good results can be obtained by mixing either one of these phenols with modifiers which contribute faster reactivity or other properties to the resulting resin. For instance, these may include phenol, 3–5 xylenol, bisphenol A, ortho-amino phenol, ortho, meta and para-cresols, and resorcinol. For instance, it has been found that when about 5 percent of resorcinol with respect to the total weight of the resin is added near the end of the condensation process, a very clear resin is formed which is particularly reactive and, therefore, highly useful as a curing resin in adhesive compositions. Depending upon the end use to which the resin of this invention is to be put, various phenols may be condensed individually or in combination with another phenol to form resins of this invention. Phenol, itself, is particularly useful as a modifier for octyl and nonyl phenols. Various other phenols such as para butyl phenol, anacardic acid, salicylic acid, and the like also may be used.

From the above, it will be seen that the very same phenolic material may be used as the catalyst and the phenol component of the resin. Thus, as much as 50 percent by weight of the resulting resin of salicylic acid may be mixed with the required amount of formaldehyde and a lesser amount of the desired base, such as zinc oxide, to form the resin. Greater amounts of salicylic acid tend to make the reaction too difficult to bring to completion. For fast curing pressure-sensitive adhesives which possess superior high temperature adhesive properties, it is preferred that the acid component of the catalyst be present in the amount of about 3–12 percent by weight of the resulting phenol formaldehyde resin. Normally, the maximum amount of zinc oxide reacted in the resin would be in the range of 10 to 15 percent by weight. However, if it is desired to obtain a white resin or if there is some other reason to react that much metal with the acid component, such as to produce a resin catalyst or accelerator containing a relatively high percentage of zinc or other metal salt, at least a molar equivalent amount of the metal may be reacted with the salicylic acid to form the resin. It is preferred that the catalyst salt be present in the resin in an amount ranging between about 2 and 25 percent by weight, although higher proportions of catalyst may be used. Thus, the minimum amount of the metal base in the resin is approximately 0.5 to 1 percent. Generally speaking, the condensation reaction proceeds favorably with either an excess of acid or an excess of base. However, it is preferred that no more than about 50 percent molar excess of the alkaline earth metal donor, or base, be used.

When it is desired to produce a reactive phenolformaldehyde resin suitable for use as a curing resin for normally tacky and pressure-sensitive adhesive compositions, a molar excess of formaldehyde to phenol must be employed in the resin mixture. Thus, it is preferred that the mol ratio of formaldehyde to phenol be at least about 1.05 to 1 to provide a reactive resin, and a ratio of at least about 1.2 is preferred for this purpose.

In producing the resin of this invention, the formaldehyde preferably is added in the form of powdered paraformaldehyde. If the acid and base are first precondensed with formaldehyde to form a catalyst mixture, either paraformaldehyde or a water solution (36 percent formalin) may be used. In any event, it is desirable to drive off any water which may be present in the catalyst mixture as quickly as possible to maintain a substantially anhydrous condensation process. The condensation reaction may be a one-step process wherein the formaldehyde normally is adducted at a temperature in the neighborhood of 180° to 200° or 220° F., basically to form the monomeric resin; and then heated at a higher temperature, i.e., above 220° F., say in the range of 250°–280° F. to condense the monomers and drive off the water which is formed. Of course, the formaldehyde could be reacted at a lower temperature, say 160° F., but the reaction would be extremely slow. However, the higher the temperature during the addition of formaldehyde, the greater will be the loss of formaldehyde due to volatilization prior to reaction.

The condensation, or dehydration, process may be terminated at any point short of obtaining a completely condensed resin depending upon the use to which the resin is to be put. For instance, when an excess of formaldehyde is used to form a reactive resin according to this invention, it has been found that more highly condensed resins cure natural rubber elastomers more readily than those at a lower level of condensation. However, with synthetic polyisoprenes such as Shell 350 and Natsyn 400 rubbers, the less condensed resins provide satisfactory cures. If the resin becomes too viscous during the latter stages of condensation or dehydration, a suitable solvent such as xylene may be added, but its use should be delayed until viscosity requires it. A preferred procedure is to condense resin until the odor of formaldehyde is minimal, add toluene and reflux until the desired level of dehydration is attained as measured by water evolved.

In addition to various rubber and elastomer-reactive resins, this invention also contemplates phenol-formaldehyde resins which may be particularly useful in producing nonsettling adhesive cements, special purpose cements, thermoplastic adhesives and the like. Certain of the resins of this invention also may be used as tackifiers in elastomeric compositions such as pressure-sensitive adhesives. As mentioned hereinbefore, others having a relatively high metal content may, themselves, be used as catalysts or accelerators in various processes involving phenolic resins. In fact, a great variety of resins according to this invention are available for use as molding resins, casting resins, or for use in paints, varnishes, and the like. Other applications and uses of the resins and adhesives of this invention will appear to one skilled in the art from the foregoing description taken together with the following examples and claims.

It should be understood that, although the following examples may describe certain specific features of this invention, they are given only for the purposes of illustration so that the invention should not be construed as limited thereto.

EXAMPLE I

Two hundred and twenty parts of nonyl phenol, 3 parts of finely divided zinc oxide, 9 parts of salicylic, and 36 parts of powdered paraformaldehyde are stirred together and heated to 215° F. At this point, an exothermic reaction carries the temperature to 240°–245° F. Within 20 minutes, a clear straw colored condensate is formed. The initial condensate is moderately fluid. After 30–35 minutes, the odor of formaldehyde is largely gone and further dehydration of the resin may be carried out for 30 minutes at 250° F. Dehydration is hastened by applying a vacuum in the latter stages of dehydration. To further hasten the dehydration step, the temperature may be raised to 285°–290° F. However, use of temperatures of 300° F. and over results in loss of resin reactivity with rubbers. The total resin preparation can easily be completed in 1 hour, with no need for washing, neutralizing and decanting steps such as are normally employed to prepare reactive resins of this type. The resulting resin has a formaldehyde to phenol, F/P, ratio of about 1.2 and contains about 4.3 percent reacted catalyst. An alternate method of dehydrating is to add 150 parts toluene to the resin at the point where the odor of formaldehyde is absent and reflux until 16 parts of water are collected in the condensate.

EXAMPLE II

A resin is prepared from 110 parts of nonyl phenol, 0.67 parts of zinc oxide and 2 parts salicylic acid with 18 parts of paraformaldehyde as described in Example I. It is necessary to supply heat to this resin for an hour during the initial condensation stage to maintain the temperature of 220° F. since a milder exotherm is experienced. The dehydration can be accomplished exactly as in the case of the previous resin. This resin is found to be slightly less reactive than the previous resin although it also has an F/P ratio of about 1.2. It contains approximately 1.9 percent of reacted zinc salicylate catalyst.

EXAMPLE III

A resin is prepared from 236 parts nonyl phenol, 16 parts zinc oxide, 48 parts salicylic acid, and 30 parts of paraformaldehyde by heating carefully while the ingredients are fluxed together. After 30 minutes at 220° F., the resin is viscous and clear when warm, but cloudy upon cooling. Further heating is provided until the resin reaches a temperature of 310° F., at which point some foaming occurs. Upon cooling, the resin is a clear, hard, light tan resin of melting point 83° C. It has an F/P ratio of less than one, i.e., 0.7, and contains about 17.8 percent reacted catalyst.

EXAMPLE IV

A harder resin is prepared from 244 parts of nonyl phenol, 24 parts zinc oxide, 72 parts salicylic acid and 33 parts paraformaldehyde when reacted as in Example III. This resin has a slightly opalescent light tan color, an F/P ratio of about 0.675, and contains about 23.6 percent reacted zinc salicylate.

EXAMPLE V

A resin is made with 110 parts nonyl phenol, 1 part calcium hydroxide, 3.3 parts salicylic acid, and 18 parts of paraformaldehyde. Although this resin does not condense as readily as the resin of Example I, a somewhat darker resin results when reacted for 15 minutes consecutively at temperatures of 200° F., 220° F., 250° F., and 280° F. The resin is slightly cloudy and shows excellent reactivity with rubber. It has an F/P ratio of about 1.2, and contains approximately 3.2 percent reacted catalyst.

EXAMPLE VI

A resin made with 110 parts of nonyl phenol, 0.55 parts MgO, 3.3 parts of salicylic acid, and 18 parts of paraformaldehyde is condensed at consecutively increasing temperatures as in the previous example, and a brownish resin results which shows some curing properties with rubber. It has an F/P ratio of approximately 1.2, and contains about 2.9 percent reacted catalyst.

EXAMPLE VII 1.68 parts of cadmium acetate are heated with 1.90 parts of salicylic acid and 3.8 parts of nonyl phenol as a fluxing agent. When the odor of acetic acid is no longer detectable, there is added to the catalyst 44 parts of nonyl phenol and 7.2 parts of paraformaldehyde. A pale straw viscous reactive resin very similar to Example I results. It possesses an F/P ratio of about 1.1, and contains about 5.7 percent reacted catalyst.

EXAMPLE VIII

Forty-seven parts of phenol, 0.6 parts zinc oxide, 2 parts salicylic acid and 17.5 parts paraformaldehyde are carefully heated to 200° F., and the temperature is then gradually increased to 220° F. and finally to 240° F. Further heating at temperatures in the range of 270°–280° F. results in an insoluble gelled mass. However, by careful heating to 240° F., a resin is produced which is heat reactive and soluble in isopropanol or acetone. The resin is water white in color and of putty-like consistency. It is dissolved to 60 percent solids is equal parts of isopropanol and methyl-ethyl ketone. The resin has an F/P ratio of about 1.2, and contains about 3.8 percent reacted catalyst.

EXAMPLE IX

A series of resins is prepared in which a mixture of 44 parts nonyl phenol, 7.2 parts paraformaldehyde, 0.48 parts of zinc oxide is heated with a series of organic phenolic acids at 15 minute intervals to consecutive temperatures of 220° F., 230° F., 255° F., and finally to 275° F. The additions are as follows:

a. with 1.44 parts salicylic acid, a light amber resin is produced.
b. with 1.44 parts metahydroxy benzoic acid, a viscous slightly cloudy resin forms.
c. with 1.60 parts gamma resorcylic acid, a viscous carmine red resin forms.
d. with 2.15 parts 2-hydroxy 3-naphthoic acid, a viscous yellow resin results.
e. with 1.80 parts of ortho hydroxy cinnamic acid, a slightly opaque yellow solid resin is formed. Similar resins may be made with calcium hydroxide as the base metal. In these resins, the F/P ratio is about 1.2, and the percentage of reacted catalyst is approximately 3.3 (In the case of resins (b)

through (e), the percentage of reacted catalyst is figured in terms of an equivalent molar proportion of zinc salicylate).

EXAMPLE X

Forty-nine parts phenol, 19 parts paraformaldehyde, 0.6 parts zinc oxide, 3.3 parts isopropanol and 1.8 parts salicylic acid are heated to a maximum temperature of 265° F. to form a water white solid resin. The salicylic acid is replaced by the following acids in equimolar quantities to give the following results:

a. metahydroxy benzoic acid forms a clear yellow putty-like resin.
b. gamma resorcylic acid gives a clear brown resin of similar consistency.
c. 2-hydroxy 3-naphthoic acid gives a solid yellow resin.

The F/P ratio is about 1.2 and the percent reacted catalyst is about 3.1 in all cases with the latter again being figured in terms of an equivalent molar proportion of zinc salicylate.

EXAMPLE XI

One-hundred parts cashew nut shell liquid consisting primarily of anacardic acid is mixed with 0.75 parts zinc oxide and 12 parts paraformaldehyde. After reaching 220° F., considerable foaming occurs as the temperature is raised to 240° F. A soft dark elastic gel forms in twenty minutes. This gel can be readily milled into rubber to serve as a reinforcing plasticizer. The resin has an F/P ratio of about 1.35, and contains approximately 0.7 percent catalyst in terms of zinc oxide.

EXAMPLE XII

One hundred and three parts octyl phenol, 18 parts paraformaldehyde, 1 part zinc oxide, and 3 parts salicylic acid are heated progressively to 220° F., 250° F. and finally to 280° F. As in Examples I and II, an oil soluble rubber-reactive resin is formed having an F/P ratio of about 1.2 and containing approximately 3 percent reacted catalyst.

EXAMPLE XIII

The following constituents are prereacted to form a catalyst for use in producing a resin according to this invention as follows: 10 parts of a 50 percent aqueous paste of zinc oxide is added to 15 parts of salicylic acid and 20 parts of a solution of equal parts by weight of formalin (36 percent formaldehyde) with methyl ethyl ketone. The mixture is heated mildly at 180° F. for 15-20 minutes during which time the salicylic acid and zinc oxide form a clear solution of zinc salicylate which, in turn, condenses with most of the formalin. Upon cooling, a syrupy clear catalyst solution is produced which can be used to catalyze phenol formaldehyde reactions according to this invention.

For example, 24 parts of the catalyst solution prepared as described is homogenized in 220 parts of nonyl phenol and 40 parts of paraform are added. Upon heating this mixture, a pasty condensate is formed in 30 minutes at 200° F., and a syrupy light straw viscous rubber-reactive resin is produced with further heating for 15 minutes at 230° F. This resin has an F/P ratio of about 1.33, and contains approximately 3.9 percent reacted catalyst.

EXAMPLE XIV

A resin is prepared from 220 parts nonyl phenol, 2.5 parts of zinc oxide, nine parts salicylic acid and 36 parts of paraformaldehyde, of which two-thirds is added initially. The mixture is heated for 30 minutes at 220° F., at which point it becomes a clear light straw colored solution, and loses about six parts of its initial weight. At this point, dehydration of the resin is undertaken by gradually raising the temperature to 250° F. Water is evolved during this step and the viscosity of the resin increases very substantially. A weight loss of about 10 parts based on initial weight is lost by allowing the water to escape freely with slow stirring. If the temperature of the resin during this heating period exceeds 280° F., the resin undergoes substantial darkening. When dehydration is completed, the temperature is allowed to drop to 220°-240° F. and the final paraform (12 parts) is added. The temperature should be maintained at 220°-240° F. for another 30 minutes or until most of the paraform has reacted. A reactive resin is formed having an F/P ratio of about 1.2 and approximately 4 percent reacted catalyst.

EXAMPLE XV

A resin which is even more reactive in curing rubber is made by incorporating resorcinol in a nonyl phenol formaldehyde resin as follows: 220 parts of nonyl phenol, two parts zinc oxide, six parts salicylic acid and 29.5 parts of paraform are heated together by gradually raising the temperature to 230° F. and holding the mixture for about 25 minutes until a clear light amber resin is formed. At this point, there is a weight loss of eight parts, mostly moisture. The temperature is raised in 10 minute intervals to 240, 250, and 260° F. while applying vacuum. A very viscous light straw colored resin forms. At this point, 10 parts of resorcinol is added carefully to avoid excess foaming. The temperature, which drops to 250° F. during the resorcinol addition, is now raised rapidly to 270° F. at which point a distinctly reddish tinted clear resin is obtained. The temperature is now reduced to 230° F. and 6.7 parts paraform are added which is allowed to react for 30 minutes at 230°-240° F., after which no formaldehyde odor is detected. A clear hard reddish tinted resin of excellent reactivity with natural rubber is formed. In this reaction, it is important to react the resorcinol with the already condensed nonyl phenol and formaldehyde or the resorcinol may phase out of the mixture. This resin has an F/P ratio of only about 1.1 and a zinc salicylate, reacted catalyst, content of about 2.8 percent.

EXAMPLE XVI

A precondensate is made by heating 100 parts of nonyl phenol, 1.25 parts zinc oxide, 3.8 parts salicylic acid, and 18 parts paraform. The heating is interrupted prior to the resin becoming clear, and while it still is in a soft pasty condition. Each of the following modifying phenols then is added to a sample of the precondensate at a level of five parts modifier to 100 parts precondensate with 0.8 parts additional paraform and the mixture heated further for 15 minutes at 250° F. to give good curing properties with natural rubber. These modifiers are ortho amino phenol, phenol, 3-5 xylenol, bisphenol A, ortho cresol, also paracresol and metacresol. All the resins prepared in this manner are clear except those modified by 3-5 xylenol and metacresol, and these are only slightly milky in appearance. These resins all can be made completely clear if the nonyl phenol is reacted further prior to adding the modifier. The F/P ratio of these resins is about 1.2 and the reacted catalyst content is approximately 3.6 percent.

EXAMPLE XVII 112.5 parts of polyisobutyl phenol (PIP) is admixed with 2.5 parts zinc oxide, 7.5 parts salicylic acid and nine parts paraformaldehyde. The mixture is reacted by heating to 220° for 45 minutes and further condensed at 260° for 30 minutes. A dark colored solid resin is formed which is rubber reactive. The color is primarily due to the color of the starting phenol and is, in fact, somewhat lighter than the initial reactants.

EXAMPLE XVIII

A solution of polyvinyl butyral is made by dissolving 11 parts Butvar B72A in 44.5 parts toluene and 44.5 parts isopropanol. Butvar B72A is a high viscosity polyvinyl butyral of molecular weight 180,000–270,000 with hydroxyl content of 17.5 – 21 percent expressed as percent polyvinyl alcohol. To 100 parts of the Butvar of the phenolic resin solution of Example VIII. To another 100 parts of Butvar B72 solution is added an equivalent amount, based on solids content, of "Bakelite BLS-2700" phenolic laminating resin. Films 2 mils thick are cast from each of the solutions by coating on release paper and evaporating the solvent. When these films are press-cured between heated platens and tested for degree of cure by measuring swelling index, i.e., weight of swollen film versus initial film weight, in tetrahydrofurane, the following results are obtained:

| Film Tested | cure 60 min. at 250° F. | cure 15 min. at 300° F. | cure 15 min. at 350° F. |
|---|---|---|---|
| Containing Example VIII Resin | 4.2 | 3.7 | 3.2 |
| Containing Commerc. PF. | 4.4 | 4.5 | 3.4 |

The relatively faster curing rate of the experimental resin is evident from the smaller swollen solvent weight ratio, and excellent adhesion to a strip of copper foil is obtained with the above solution base on this resin.

EXAMPLE XIX

Oil soluble reactive resins can be tested for their rubber curing properties by milling the resin into an elastomer at 10 parts resin per hundred total composition, and pressing a ten gram sample between heated platens to cure the rubber. The platens are heated to 350° F. and the dwell time is 90 seconds. Spacers are inserted to limit the amount of compression to 125 mils. The Williams plasticity of the samples then is measured to indicate resistance to flow, or the state of the cure. Williams plasticity is determined in a Williams Plastometer, such as described in ASTM D-926. A two gram pellet is preconditioned by heating it for 15 minutes at 100° C. in an oven. The pellet then is compressed for 15 minutes in the Plastometer. The thickness of the compressed pellet, in millimeters, is noted and reported as the Williams Plasticity.

The resins of Example IX when tested in the manner described, give the following results with an elastomer base of 50 parts smoked sheet rubber and 50 parts of Natsyn synthetic polyisoprene, grade NRS; the rubbers being preblended together on an open mill for three minutes.

| | Salicylic | Meta hydroxy benzoic | Gamma resorcylic | 2-hydroxy 3-napthoic | ortho hydroxy cinnamic |
|---|---|---|---|---|---|
| Zinc catalyst: | | | | | |
| Uncured plasticity | 1.62 | 1.56 | 1.76 | 1.44 | 1.70 |
| Cured plasticity | 2.37 | 1.81 | 2.30 | 1.60 | 1.94 |
| Calcium catalyst: | | | | | |
| Uncured plasticity | 1.78 | 1.55 | | | |
| Cured plasticity | 2.30 | 1.80 | | | |

The difference in plasticity value is a measure of the cure which is taking place due to the curing properties of the oil soluble heat reactive resin.

In a similar experiment in which pale crepe rubber is cured, the plasticity results found are as follows:

| Resin of: Metal Salt | Ex. I Zinc | Ex. V Calcium | Ex. VI Magnesium | Ex. VII Cadmium |
|---|---|---|---|---|
| Uncured Plasticity | 1.55 | 1.75 | 1.68 | 1.63 |
| Cured Plasticity | 1.90 | 3.28 | 1.88 | 2.36 |

In another experiment in which Neoprene WM-1 is the elastomer and resins with high zinc catalyst content are used, the results are:

| Resin of: | Example III | Example IV |
|---|---|---|
| Uncured Plasticity | 1.30 | 1.24 |
| Cured Plasticity | 4.78 | 5.09 |

These resins, when used to cure neoprene cements, will not settle out of solution as will zinc oxide, and are characterized by improved aging under heat as contrasted with rosin derivatives of zinc for curing neoprene.

Using the resins of Examples III and IV as an added catalyst for curing rubbers, with a commercial oil soluble para octyl phenol-formaldehyde resin (Amberol ST-137) as the curing agent, a series of cure time and temperature variations give cured plasticity results as follows with pale crepe rubber as the elastomer.

| | | Cure time | | | |
|---|---|---|---|---|---|
| Cure temp., °F. | Room temp. | 3 min. 275 | 2.5 min. 300 | 2 min. 325 | 1.5 min. 350 |
| 5 p. Amberol and 5 p. Example III | 2.2 | 2.2 | 2.5 | 2.6 | 4.0 |
| 5 p. Amberol and 5 p. Example IV | 2.1 | 2.1 | 2.2 | 2.9 | 4.4 |
| 5 p. Amberol and 5 p. Zirex (basic zinc rosinate) | 1.9 | 1.6 | 1.9 | 2.1 | 3.2 |
| 10 p. Amberol (no catalyst resin) | 2.5 | 2.3 | 2.2 | 2.5 | 2.9 |

Thus, the catalyst resins are more effective than zinc rosinate in promoting rubber cures.

EXAMPLE XX

A resin made according to Example VIII is made wherein the F/P ratio is 0.9. When this resin is mixed with an epoxy resin from epichlorhydrin and bisphenol A (Araldite 6010), and heated to 140° F., an exothermic reaction occurs and water white clear castings are formed in a few minutes. The ratio of phenolic to epoxy resin which will co-react to form solid clear castings ranges from 1:2 to 2:1. If reactive phenolic resins (F/P>1) are used to cure the epoxy resins, there is a tendency for foaming to occur during the curing reaction.

EXAMPLE XXI

Pressure-sensitive adhesives are made by adding to lightly milled synthetic polyisoprene rubber (Natsyn 400) of a plasticity 2.91 in solution of toluene at 16.7 percent solids per 100 parts rubber, 55 parts of polyterpene resin (mp. 115° C) and 20 parts of resin solids from Examples I, II, XII and XIII. The adhesives are coated at 1.9 oz./sq. yd. on paper tape backings impregnated as described in U.S. Letters Pat. No. 2,726,967. The coated backings are slit into tape samples one inch wide and tested in accordance with the tests described below. These pressure-sensitive adhesives and tapes are compared in performance with a similar composition whose curing components are 15 parts Amberol ST-137 resin and five parts zinc resinate. Each of these adhesive tapes is cured by heating it for 20 seconds at 370° F. with the following results:

| Cure System | Plast. 100°F. | Peel adhesion | Tack | Hot Peel (oz.) | 4 hr. Bake 300°F. |
|---|---|---|---|---|---|
| Ex. I | 2.88 | 27 oz. | 9 | 3 | Clean |
| Ex. II | 3.68 | 27 oz. | 10 | 4 | Clean |
| Ex. XII | 3.19 | 28 oz. | 8 | 3.5 | Clean |
| Ex. XIII | 3.12 | 26 oz. | 4 | 4 | Clean |
| Commercial | 2.75 | 28 oz. | 7.5 | 0.5 | Clean |

For plasticity measurement, the samples are coated on release paper and removed following the curing step to provide 2 gm. samples for test.

Peel adhesion is measured by the standard method of the Pressure Sensitive Tape Council. Tack or quick stick is measured by laying a length of tape, adhesive side up, upon a horizontal surface and then rolling a hollow plastic ball down an incline onto the adhesive. The vertical height at which the ball starts and the distance the ball rolls along the tape before coming to rest is measured. Quick stick is reported as the height in inches raised to the three-halves power, divided by the distance rolled in inches. This ratio is found to be a constant for a given tape. The ball used is plastic, approximately 1.5 inches in diameter, and weighs approximately 2 grams. Its outer surface is carefully cleaned between each test.

The hot peel test is a most important performance test for indicating the ability of tape to hold masking aprons on painted surfaces when the finishes are baked in an oven with hot air blasting on the surface. This test measures the minimum force necessary to peel the tape from a stainless steel panel to which it has been applied, and is measured by pulling the tape 180° from itself at a rate of 4 in./min., while a blast of air from a hot air gun, located 3 inches in front of the tape, is causing air to impinge at a temperature of 318° F. Most significantly, if the catalyst content of Example I is increased to four parts zinc oxide and 20 parts salicylic acid, a resin is produced which gives even higher hot peel results, in the neighborhood of 10 ounces, when formulated into a pressure-sensitive adhesive.

EXAMPLE XXII

A pressure-sensitive adhesive tape is made similarly to the description of the previous example using a composition of 75 parts Shell 350 polyisoprenestyrene copolymer, 25 parts SBR 4502 butadiene-styrene copolymer and 60 parts of polyterpene resin having a melting point of 115° C. A curing component of 20 parts of the resin of Example XIII is compared with the commercial octyl phenol-formaldehyde resin - zinc resinate mixture of the preceding example (15 parts resin and five parts zinc resinate). The adhesives are coated onto paper tape backings and cured 30 seconds at 370° F. The tape properties are:

| | Peel Adhesion (oz.) | Tack | Angular Hot Hold |
|---|---|---|---|
| Tape with Experimental Resin (Example XIII) | 44 | 3.6 | No Peel — 2 hrs. |
| Tape with Commercial PF Resin | 45 | 0.7 | Peel 6''— 24 min. |

The Angular hot hold is performed by attaching a 100 gm. weight to a ½ inch strip of tape applied to a stainless steel panel inclined at 20° from the vertical. The length of tape is 6 inches and observation is made as to how long it requires for the tape to peel 6 inches when the angular assembly is placed in an oven at 300° F. with forced hot air circulation. This test corresponds in importance to the hot peel test of the previous example.

If 20 parts of the commercial PF resin is used (in place of 15 parts) with five parts zinc resinate catalyst, tack will be somewhat improved but the angular hot hold will decrease slightly and result in failure in 20 minutes.

EXAMPLE XXIII

A resin is made according to Example I and used to prepare adhesive tapes as follows:

a. 100 parts pale crepe rubber, plasticity 2.5 mm (100° C.), 60 parts alpha terpene resin mp. 115° C., 0.25 parts toluene diisocyanate, and 20 parts of the curing resin.

b. 100 parts pale crepe rubber, 60 parts beta-terpene resin (mp. 115° C.), 0.25 parts toluene diisocyanate, and 20 parts of the curing resin.

c. 75 parts pale crepe rubber and 25 parts SBR 4502 butadiene-styrene as the elastomer mixture, with the other components as in (b), above.

d. 75 parts synthetic polyisoprene (plasticity 2.8 mm.—100° C.) known as Natsyn 400, 25 parts SBR 4502, 60 parts polyisoprene resin (designated Wingtack — mp. 85° C.), 0.25 parts toluene diisocyanate, and 20 parts of the curing resin.

The above adhesives are coated on paper tape backings at a weight of 2 oz./sq. yd., cured 30 minutes at 370° F., and then tested to give the following results:

| Sample | Peel Adhesion (oz.) | Tack | Hot Peel (oz.) |
|--------|---------------------|------|----------------|
| (a) | 35 | 6.7 | 6 |
| (b) | 37 | 4 | 3 |
| (c) | 46 | 2 | 3.5 |
| (d) | 30 | 10 | 1.5 |

EXAMPLE XXIV

The remarkably fast curing effected with resins of this invention (particularly at lower temperatures) is illustrated in the following table where a prior art commercial resin is compared with resins according to Examples XIV, XV, and XVI, and with resins of Examples I and XVI modified by adding 0.5 parts of finely ground boric acid in the dehydrating step to maintain a lighter color, and vacuum dehydrating for only 15 minutes at 260° F. The table shows varying plasticities for the different test conditions indicated.

| Elastomer | Resin | Original | 3 min., 275° F. | 2.5 min., 300° F. | 2 min., 325° F. | 1.5 min., 350° F. |
|-----------|-------|----------|-----------------|-------------------|-----------------|-------------------|
| Pale crepe rubber | Example XIV | 2.1 | 2.2 | 2.4 | 2.8 | 3.8 |
| Do | Example XV | 2.5 | 3.8 | 4.7 | 5.3 | 7.6 |
| Do | Example I (modif.) | 2.3 | 2.4 | 2.6 | 3.0 | 3.6 |
| Do | Amberol ST-137 | 2.5 | 2.5 | 2.4 | 2.5 | 3.1 |
| Natsyn 410 polyisoprene | Example XVI | 1.7 | 5.7 | 7.1 | 7.7 | 8.5 |
| Do | Example XVI (modif.) | 2.2 | 3.4 | 4.9 | 6.9 | 7.4 |
| Do | Amberol ST-137 | 2.3 | 2.6 | 2.8 | 3.7 | 4.0 |

NOTE.—Natsyn 410 is a synthetic polyisoprene having a Mooney viscosity at 212° F. of approximately 50.

In all of the foregoing examples, wherein the resin of this invention is used in a rubber or elastomer system, a small percentage, normally about one or two parts, of a conventional antioxidant is used in the formulation. In fact, small percentages of antioxidants and the like may be used wherever required in formulating the resin of this invention.

As indicated hereinbefore, it will be seen from the above description and examples that the resin of this invention offers many advantages in addition to the speed and economy with which it can be manufactured and the flexibility which it offers in the manufacturing process. The very fact that the condensation catalyst is a phenol and becomes a reacted component of the resulting resin offers possibilities which previously were unavailable. For instance, as indicated hereinbefore, when the resin is produced in reactive form with an excess of formaldehyde to phenol, the resulting phenol-formaldehyde resin provides improved cures in adhesive systems and the like without the addition of any other accelerator. Since the reacted catalyst is part of the curing resin, it remains uniformly dispersed in the system and, therefore, is highly effective as an accelerator. It also will be seen that the resin of this invention improves the adhesive properties of elastomer systems and other mixtures of this invention and, therefore, offers new advantages where adhesion characteristics of cured rubbers, oil bodied varnishes, or resinous mixtures are critical.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A heat-curable elastomeric composition which comprises an aldehyde-resin-reactive elastomer, an oil-soluble heat curing aldehyde resin present in the amount of about five to about 75 parts per hundred parts of said elastomer, said resin being a partially condensed phenol-formaldehyde resin wherein the mol ratio of formaldehyde to phenol is at least about 1.05 to 1 and which consists essentially of the product of the substantially anhydrous heat condensation of formaldehyde together with both a major proportion by weight of the resin of an ortho or para alkyl or aryl substituted first phenol and about 2–25 percent by weight of the resin of a phenolic condensation catalyst consisting essentially of an alkaline earth metal carboxylate salt of an ortho or meta hydroxy ring substituted monobasic aromatic or phenyl terminated aliphatic carboxylic acid, said alkaline earth metal being selected from the class consisting of zinc, cadmium, calcium and magnesium.

2. An elastomeric composition according to claim 1, wherein said acid is a benzoic or naphthoic acid, or a phenyl terminated unsaturated aliphatic acid having less than four carbon atoms in the aliphatic chain.

3. An elastomeric composition according to claim 2, wherein said acid is salicylic acid.

4. An elastomeric composition according to claim 1, wherein said alkaline earth metal is selected from the group consisting of zinc, cadmium, calcium and magnesium.

5. An elastomeric composition according to claim 4, wherein said acid is salicylic acid.

6. An elastomeric compsotion according to claim 5, wherein said salt is zinc salicylate.

7. An elastomeric adhesive composition according to claim 1, which is normally tacky and pressure-sensitive and comprises about 25–500 parts per hundred parts of said elastomer of a tackifier compatible with said elastomer and said resin.

8. A pressure-sensitive adhesive sheet or tape comprising a flexible backing coated on at least one major surface thereof with a pressure-sensitive adhesive composition, said sheet or tape being wound upon itself in successive convolutions to form a roll from which it is rapidly unwindable without delamination or offsetting of the adhesive on the backing, said adhesive composition comprising an aldehyde-resin-reactive elastomer and a heat curing phenol-formaldehyde resin, said resin consisting essentially of the product of the substantially anhydrous heat condensation of formaldehyde together with both a major proportion by weight of the resin of an ortho or para alkyl or aryl substituted first phenol and about 2–25 percent by weight of the resin of a phenolic condensation catalyst consisting essentially of an alkaline earth metal carboxylate salt of an ortho or meta hydroxy ring substituted monobasic aromatic or phenyl terminated aliphatic carboxylic acid, said alkaline earth metal being selected from the class consisting of zinc, cadmium, calcium and magnesium.

9. A pressure-sensitive adhesive sheet or tape according to claim 8, wherein the hydroxy ring substitution is in the ortho or meta position.

10. A pressure-sensitive adhesive sheet or tape according to claim 9, wherein said acid is a benzoic or naphthoic acid, or a phenyl terminated unsaturated aliphatic acid having less than four carbon atoms in the aliphatic chain.

11. A pressure-sensitive adhesive sheet or tape according to claim 10, wherein said acid is salicylic acid.

12. A pressure-sensitive adhesive sheet or tape according to claim 10, wherein said alkaline earth metal is selected from the group consisting of zinc, cadmium, calcium, and magnesium.

13. A pressure-sensitive adhesive sheet or tape according to claim 12, wherein said salt is zinc salicylate.

14. A pressure-sensitive adhesive sheet or tape according to claim 12, wherein the salicylic acid is present in the amount of about 3–12 percent by weight of the resin.

* * * * *

UNITED STATES PATENT OFFICE
CERTIFICATE OF CORRECTION

Patent No. 3,725,322　　　　　　　　　Dated April 3, 1973

Inventor(s) Charles Leslie Weidner

It is certified that error appears in the above-identified patent and that said Letters Patent are hereby corrected as shown below:

In Column 9, lines 34-35, " To 100 parts of the Butvar of the phenolic resin solution " should read --- To 100 parts of the Butvar solution is added 6 parts of the phenolic resin solution ---.

In Column 14, line 39, "compsotion" should read --- composition ---.

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents